United States Patent
Hui et al.

(10) Patent No.: US 6,304,068 B1
(45) Date of Patent: Oct. 16, 2001

(54) BI-DIRECTIONAL SWITCHED-CAPACITOR BASED VOLTAGE CONVERTER

(75) Inventors: Shu-Yuen Ron Hui; Shu-Hung Henry Chung, both of Hong Kong (HK)

(73) Assignee: City University of Hong Kong, Kowloon (HK)

(*) Notice: Subject to any disclaimer, the term of this patent is extended or adjusted under 35 U.S.C. 154(b) by 0 days.

(21) Appl. No.: 09/553,116

(22) Filed: Apr. 20, 2000

(51) Int. Cl.[7] ............................................. G05F 1/40
(52) U.S. Cl. ................................... 323/288; 323/225
(58) Field of Search ............................. 323/288, 284, 323/285, 224, 225, 233, 266, 282

(56) References Cited

U.S. PATENT DOCUMENTS

| | | | |
|---|---|---|---|
| 4,347,474 | * 8/1982 | Brooks et al. | 323/224 |
| 4,736,151 | * 4/1988 | Dishner | 323/224 |
| 4,999,568 | * 3/1991 | Gulczynski | 323/351 |
| 5,629,607 | * 5/1997 | Callahan et al. | 323/237 |
| 5,880,581 | * 3/1999 | Yang | 323/288 |

* cited by examiner

Primary Examiner—Shawn Riley
(74) Attorney, Agent, or Firm—Merchant & Gould P.C.

(57) ABSTRACT

A bidirectional switched-capacitor power converter has a first step-up mode and a second step-down mode. The converter includes a capacitor in which in both modes is charged during a first switch topology and then discharged during a second switch topology. Two converters operating out of phase may be disposed in parallel to enable continuous power conversion.

8 Claims, 4 Drawing Sheets

HIGH-VOLTAGE (HV) SIDE
$V_{HV}$

LOW-VOLTAGE (LV) SIDE
$V_{LV}$

TOPOLOGY AI

HIGH-VOLTAGE (HV) SIDE
$V_{HV}$

LOW-VOLTAGE (LV) SIDE
$V_{LV}$

TOPOLOGY AII

HIGH-VOLTAGE (HV) SIDE
$V_{HV}$

LOW-VOLTAGE (LV) SIDE
$V_{LV}$

TOPOLOGY BI

HIGH-VOLTAGE (HV) SIDE $V_{HV}$

LOW-VOLTAGE (LV) SIDE $V_{LV}$

TOPOLOGY BII

HIGH-VOLTAGE (HV) SIDE $V_{HV}$

LOW-VOLTAGE (LV) SIDE $V_{LV}$

BI-DIRECTIONAL SWITCHED-CAPACITOR BASED VOLTAGE CONVERTER

FIELD OF THE INVENTION

This invention relates to a voltage converter, and in particular to a bi-directional switched capacitor voltage converter.

BACKGROUND OF THE INVENTION

In current technology, most VSLI chips operate at low voltages and as a consequence ultimately require DC—DC converters that are compact, lightweight, of high power density, high conversion efficiency and that ideally can be realized in IC technology. To meet these objectives many switched-capacitor (SC)-based converters have been developed that use semiconductor switches and capacitors to convert or invert DC voltages. As they do not require magnetic devices they are small in size and amenable to monolithic integration. With the increase in popularity of SC-based converters, a range of designs have been produced.

However, existing SC-based converters are normally limited to unidirectional power conversion for a specific designed circuit structure. What would be highly desirable would be a bi-directional converter that could perform both high to low and low to high voltage conversion with a single circuit design.

SUMMARY OF THE INVENTION

According to the present invention there is provided a bidirectional switched-capacitor power converter, wherein said power converter comprises a single circuit configuration having two modes of operation, a first mode providing for energy conversion from a high-voltage side to a low-voltage side, and a second mode providing for energy conversion from a low-voltage side to a high-voltage side.

In a preferred embodiment the circuit configuration comprises a capacitor that in both the first and second modes is charged in a first topology and is discharged in a second topology. When the circuit is operated in a first step-up mode the capacitor is charged from the low-voltage side and is discharged to the high-voltage side. When the circuit is operated in a second step-down mode the capacitor is charged from the high-voltage side and discharged to the low-voltage side.

Preferably the converter comprises a plurality of semiconductor switches and each topology corresponds to a different switch configuration, and the topology switching means comprising means for changing the configuration of said switches.

Preferably means are also provided for controlling the conversion factor of the converter both in the step-up and the step-down modes. The conversion factor is in fact dependent on the charge of the capacitor when the converter changes from the first to second topologies. Preferably therefore the means for controlling the conversion factor comprises means for controlling the charge of the capacitor. One way of achieving this is to charge the capacitor by means of a charging current and providing means for controlling the magnitude of the charging current. This may be achieved, for example, by applying an appropriate control voltage to the gate-source of a MOSFET switch.

In its most basic embodiment the invention provides a converter as described above in which power is converted (either in a step-up or a step-down mode) in only half of an operating cycle as a capacitor is charged and discharged. To provide smooth input current and output voltage waveforms therefore, the present invention provides a bidirectional switched-capacitor power converter comprising first and second converters arranged in parallel, each converter having step-up and step-down modes of operation, wherein said first and second converters each include a capacitor and each mode of operation comprises a capacitor charging-discharging cycle, and wherein said first and second converters are operated out of phase whereby when the first converter is in a capacitor charging phase the second converter is in a capacitor discharging phase, and vice versa.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
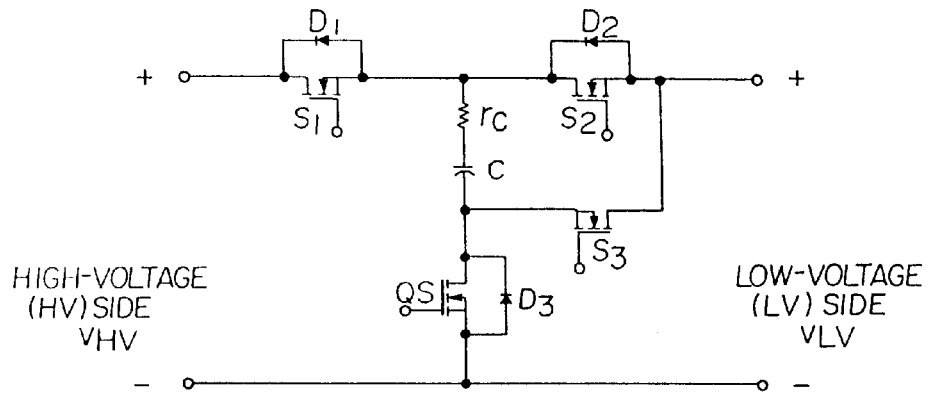
FIG. 1 is a circuit diagram of a converter according to a first embodiment of the invention, FIGS. 2(a) and (b) are circuit diagrams showing the operation of the converter of FIG. 1 in a first mode, FIGS. 3(a) and (b) are circuit diagrams showing the operation of the converter of FIG. 1 in a second mode.

Referring firstly to FIG. 1 there is shown the basic structure of a SC-based bi-directional converter cell. The cell has a high-voltage (HV) side on the left of FIG. 1, and a low-voltage (LV) side on the right of FIG. 1. As will be explained in the following description, with a single circuit structure the cell is capable of bi-directional voltage conversion and a high voltage applied to the left input side can be converted to a low voltage or vice versa.

The cell of FIG. 1 comprises a capacitor (C) that is common to both the high-voltage and low-voltage sides and which has an equivalent series resistance (ESR) of $r_c$; four semiconductor switches ($S_1$, $S_2$, $S_3$ and QS) of which $S_1$ is on the HV side, $S_2$ and $S_3$ are on the LV side (with switch $S_3$ being in parallel to switch $S_2$ and capacitor C) and the switch QS is common to both sides and is in series with capacitor C. The cell also comprises three diodes ($D_1$, $D_2$ and $D_3$). Diodes $D_1$ and $D_2$ are in parallel to switches $S_1$ and $S_2$, while diode $D_3$ is in parallel to switch QS.

Switches $S_1$, $S_2$, and $S_3$ are operated as static switches with on resistance $r_{on}$, while switch QS is used to control the charging current of C during the saturation operation and is operated in either cutoff, saturation or triode region as will be explained below.

Figure 7:
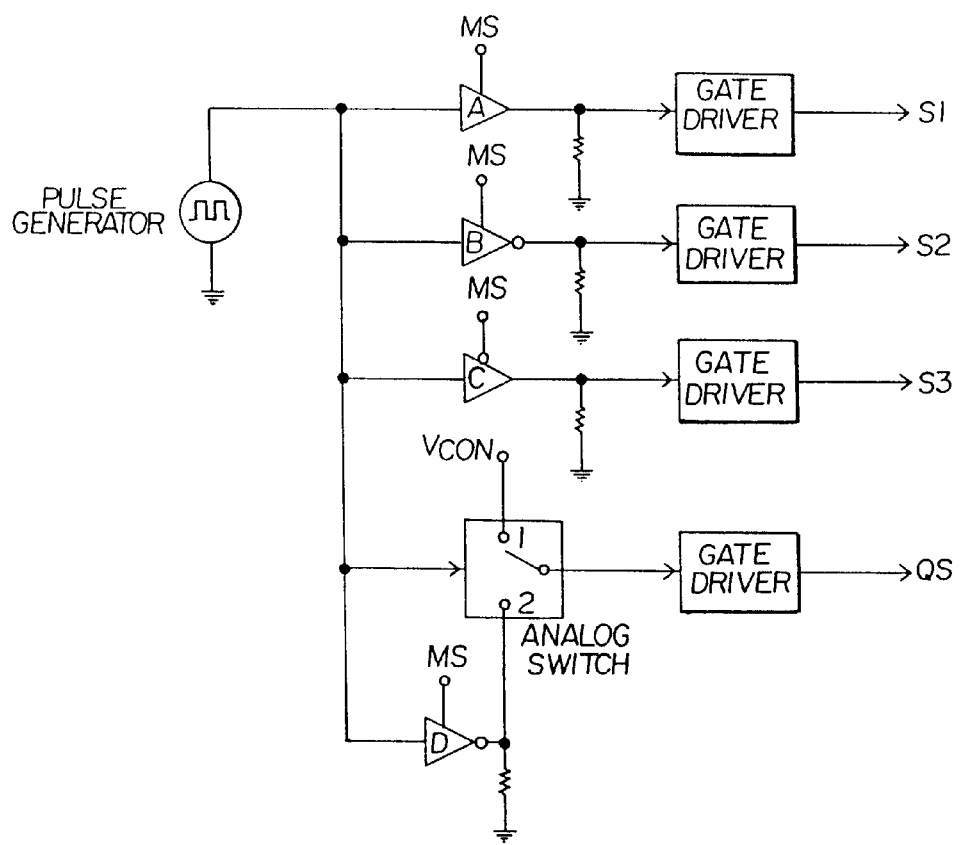
FIG. 7 is a block diagram of a control means for controlling the position of the switches.

The cell of FIG. 1 is capable of operating in two different modes, which will for convenience be referred to as modes A and B. Mode A is a step-down conversion operation in which energy is transferred from the high-voltage side to the low-voltage side. Conversely, mode B is a step-up conversion operation in which energy is transferred from the low-voltage side to the high-voltage side. As will be explained below, each mode is divided into two halves or topologies I and II which are distinguished by different switch settings. Control means are provided to change the switch settings to switch between topologies I and II. FIG. 7 illustrates how this is done. FIG. 7 is a block diagram of the control logic. In effect, the gate signals of all the switches are derived from a pulse generator which generates pulses of 50% duty cycle. The mode signal (MS) is used to govern the timing diagram of the switches as described in Table I below. For example, in Mode A topology, the MS is 'high' and the tri-state buffer A will allow signal transmission from the input to the output. Hence, when the pulse generated by the pulse generator is 'high', the gate driver will activate switch S1. When the pulse generated by the pulse generator is 'low', the gate driver will deactivate switch S1. For the switch QS, the analog switch, which the pulse generator controls, selects the gate signal. When the generated pulse is 'high', the analog switch position will be at '1'. QS will get the control voltage $V_{con}$ to control the drain current. When the generated pulse is 'low', the tri-state inverter D will control the gate signal to QS. In topology A, MS is 'high' and the gate signal to QS is then 'low'.

The operation of these two modes will now be described. For convenience of understanding, Table I below shows the condition of the switches during modes A and B and their respective topologies.

TABLE I

| Switch | Mode A Topology | | Mode B Topology | |
|---|---|---|---|---|
| | AI | AII | BI | BII |
| $S_1$ | ON | OFF | OFF | OFF |
| $D_1$ | OFF | OFF | OFF | ON |
| $S_2$ | OFF | ON | OFF | OFF |
| $D_2$ | OFF | OFF | ON | OFF |
| $S_3$ | OFF | OFF | OFF | ON |
| QS | Saturation | ON | Saturation | OFF |
| $D_3$ | OFF | ON | OFF | OFF |

Figure 2A:
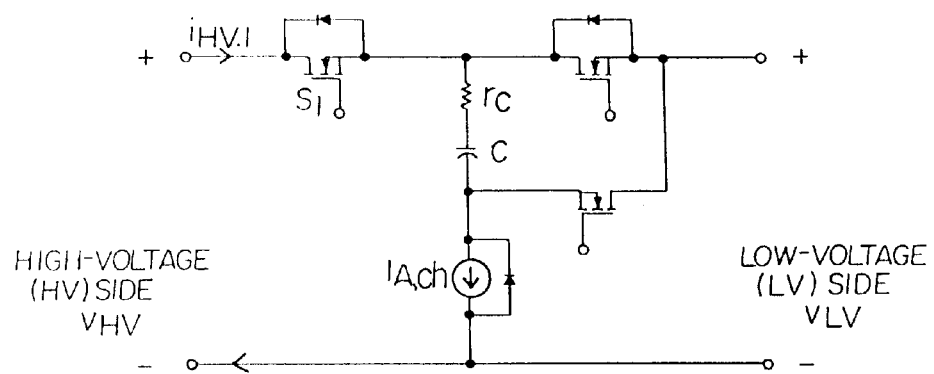
Figure 2B:
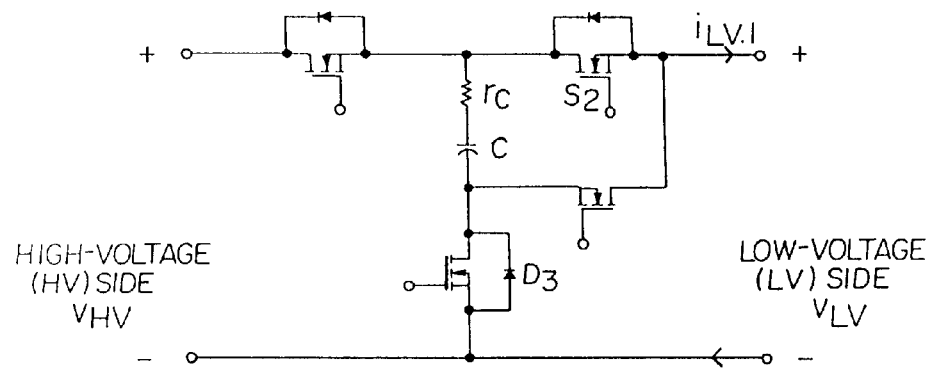

Considering firstly the step-down operation of the cell, ie Mode A, this mode has two different topologies AI and AII which are shown in FIGS. 2(a) and (b) respectively. In this context, by the term topology is meant a particular configuration of switch settings as set out in Table 1 above. In the first topology of Mode A, AI, all the switches are open except for switch $S_1$ which is on and switch QS which is in saturation mode. In this topology the capacitor C is linearly charged with a current $I_{A,Ch}$ (the magnitude of which is determined by the gate source voltage of switch QS) from the high-voltage side through switch $S_1$ for a time period $T_s/2$ where $T_s$ is the cycle period of the Mode A operation. At the end of topology AI the capacitor C has been charged to a voltage slightly higher than the low-voltage side in order to compensate for parasitic resistance and diode voltage drop in the next topology.

In the second half of Mode A, ie topology AII, switches $S_2$ and $D_3$ are closed while all other switches are open. The capacitor C is then disconnected from the high-voltage side and is discharged to the low-voltage side through $S_2$ and $D_3$ for the second half of the period $T_s$.

The conversion factor of the step-down mode A is determined by the charging current $I_{A,Ch}$ that flows through the capacitor C during topology AI, since $$V_{LV}=I_{A,Ch}R_{LV}=K_I(V_{con}-V_T)^2R_{LV}$$

Where $R_{LV}$ is the load resistance on the low-voltage side, $V_{con}$ is the control voltage across the gate and source of QS, and $V_T$ is the threshold voltage of MOSFET switch QS. Since the charging current is in turn controlled by the control voltage applied to the gate-source of the MOSFET QS, the conversion factor can be selected by simply varying this control voltage.

Figure 3A:
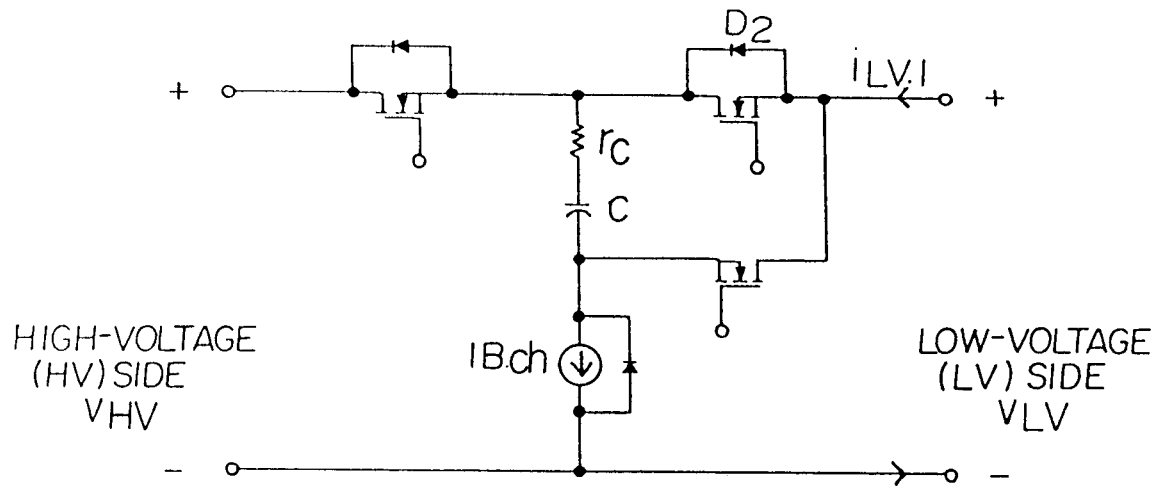

In the step-up operation of Mode B. again there are two topologies BI and BI that each operate for one half $T_s/2$ of the cycle period $T_s$. The two topologies BI and BII are shown in FIGS. 3(a) and (b). Control means are provided as in mode A for changing the switch configurations after half a cycle in order to switch from topology BI to topology BII. In topology BI, FIG. 3(a), $D_2$ is closed and QS is in saturation mode while all other switches are open. In this topology capacitor C is linearly charged from the low-voltage side through $D_2$ and QS with a current $I_{B,Ch}$ (the magnitude of which as in Mode A, will depend on the gate source voltage of switch QS). By the time topology BI comes to an end after $T_s/2$ the capacitor C is charged to a voltage slightly greater than the difference between the high-voltage and low-voltage sides ($V_{HV}-V_{LV}$) in order to compensate for parasitic resistance and diode voltage drop in topology BII.

Figure 3B:
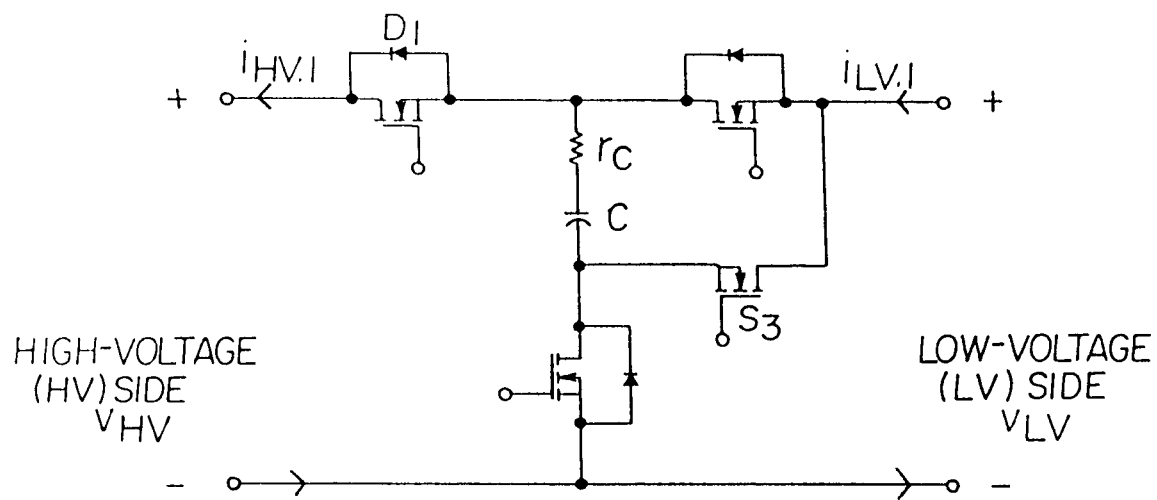

FIG. 3(b) shows topology BII in which $D_1$ and $S_3$ are closed while all other switches are open. C is then connected in series with the low voltage side through $D_1$ and $S_3$ and is discharged to supply energy to the high-voltage side. As with the step-down operation of Mode A, in the step-up configuration of Mode B the conversion factor depends on the capacitor charging current $I_{B,ch}$ during the first half of the cycle and this in turn depends on the control voltage applied to the gate-source of the MOSFET switch QS. IN particular:

$$V_{HV}=I_{B,ch}R_{HV}=K_I(V_{con}-V_T)^2R_{HV}$$

Where $R_{HV}$ is the load resistance of the high-voltage side.

Figure 4:
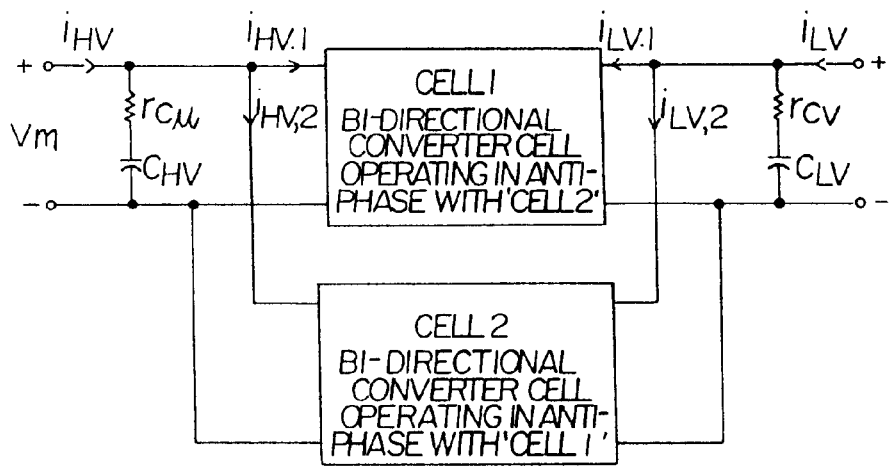
FIG. 4 is a block diagram of a second embodiment of the invention.

It will be noted that when the converter cell is functioning either as a step-up converter or as a step-down converter, the mode consists of a capacitor charging topology followed by a capacitor discharging topology, each topology occupying one half of a cycle period. In order to smooth operation, two such cells may be arranged in parallel and operating out of phase such that when acting as a step-down converter when one cell is in topology AI the other is in topology AII, and when acting as a step-up converter when one cell is in topology BI the other is in BII. This possibility is shown in FIG. 4 which shows two cells Cell 1 and Cell 2 arranged in parallel. The high-voltage and low-voltage sides are connected together with smoothing capacitors $C_{HV}$ and $C_{LV}$ being provided in parallel in order to smooth the respective terminal voltages.

Figure 5:
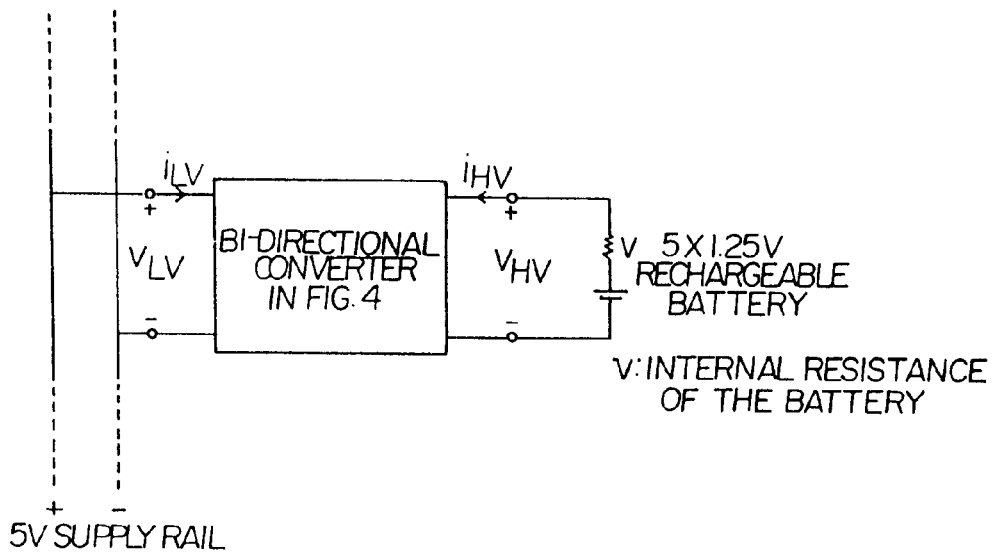
FIG. 5 is a diagram showing a test embodiment, FIGS. 6(a) and (b) are waveforms of the test embodiment of FIG. 5.

The embodiment of FIG. 4 has been tested in the form of a 5V/9V, 20 W, bidirectional converter as shown in FIG. 5. The component values of the converter of this test embodiment are as set out in the following Table II, and the switching frequency is 180 kHz.

TABLE II

| Component | Value |
|---|---|
| C, $C_{HV}$, $C_{LV}$ | 100 μF |
| $R_c$ | 0.01Ω |
| QS | 2SK942; ($K_1$ = 5.1A/V$^2$; $K_2$ = 7.1A/V$^2$) |
| S | 2SK1792 |
| $R_{on}$ | 15mΩ |
| D | 1N5822 |

As shown in FIG. 5, in this test embodiment of the invention the high-voltage side (HV) is connected to a rechargeable battery and the low-voltage side is connected to a supply rail which is normally at a voltage of 5V. In normal operation the battery is charged through the converter, but when there is a power outage in the supply rail the converter will convert energy stored in the battery back to The supply rail.

Figure 6A:
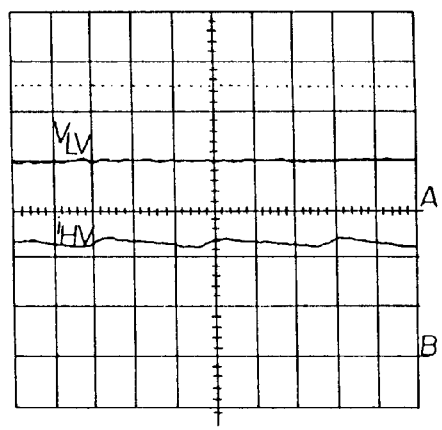
Figure 6B:
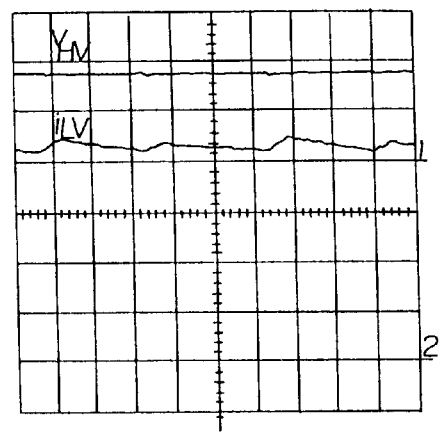

The overall efficiency, which includes the required power for the driving circuit, was found to be 85% in Mode A operation and 80% in Mode B operation. FIG. 6(a) shows the measured waveforms of $V_{LV}$ and $I_{HV}$ when the converter is in Mode A operation, while FIG. 6(b) shows the measured waveforms of $V_{HV}$ and $I_{LV}$ when the converter is in Mode B operation. It should be noted that the input current is continuous and does not contain pulsating peaks.

It will be seen that the present invention provides a bidirectional switched-capacitor converter that with a single configuration is capable of functioning as either a step-up or a step-down converter. In addition to requiring no inductive element, the present invention combines the advantages of previously developed SC-based power conversion techniques giving better regulation capability and continuous current operation in both the step-up and step-down modes of operation.

What is claimed is:

1. A bidirectional switched-capacitor power converter, wherein said power converter comprises a single circuit configuration having two modes of operation, a first mode providing for energy conversion from a high-voltage side to a low-voltage side, and a second mode providing for energy conversion from a low-voltage side to a high-voltage side, wherein said circuit comprises a capacitor serving as an energy storage element between the low-voltage side and the high-voltage side and wherein each said mode comprises a first topology wherein said capacitor is charged and a second topology wherein said capacitor is discharged.

2. A converter as claimed in claim 1 wherein when said converter is operated in said first mode said capacitor is charged from said high-voltage side in said first topology and is discharged to said low-voltage side in said second topology.

3. A converter as claimed in claim 1 wherein when said converter is opreated in said second mode said capacitor is charged from said low-voltage side in said first topology and is discharged to said high-voltage side in said second topology.

4. A converter as claimed in claim 1 wherein means are provided to switch said converter from each said first topology to each said second topology.

5. A converter as claimed in claim 4 wherein said converter comprises a plurality of switches and each said topology corresponds to a different switch configurations said topology switching means comprising means for changing the configuration of said switches.

6. A converter as claimed in claim 1 wherein means are provided for controlling the conversion factor of said converter by controlling the charging of said capacitor.

7. A converter as claimed in claim 6 wherein said capacitor is charged through a MOSFET switch.

8. A converter as claimed in claim 7 wherein said charging of said capacitor is controlled by controlling the charging current by means of applying a control voltage to the gate-source of said MOSFET switch.

* * * * *